Patented Oct. 3, 1950

2,524,529

UNITED STATES PATENT OFFICE 2,524,529

PREPARATION OF ORGANO-SILICON COMPOUNDS

Robert H. Krieble, Schenectady, N. Y., assignor to General Electric Company, a corporation of New York No Drawing. Application April 8, 1947, Serial No. 740,261

12 Claims. (Cl. 260—448.2)

This invention relates to the preparation of organo-silicon compounds and more particularly to the production of hydrocarbon-substituted halogenosilanes.

The present invention is based on my discovery that hydrocarbon-substituted halogenosilanes can be prepared by effecting reaction in the liquid phase at a temperature of from about 0° to 150° C. in the presence of a catalyst for the reaction between (1) an unsaturated compound selected from the class consisting of unsaturated aliphatic hydrocarbons and unsaturated cycloaliphatic hydrocarbons and (2) a silicon compound containing at least one hydrogen and at least one halogen attached directly to the silicon atom, the remaining valences of the silicon being satisfied by a member of the group consisting of hydrogen, monovalent hydrocarbon radicals and halogens until all the valences of the silicon are satisfied.

For purposes of brevity the compound defined in (1) above will be referred to hereinafter in the description of this invention as the "unsaturated compound" and the silicon compound defined in (2) above will be referred to as the "silicon hydride."

It was known prior to my invention that hydrocarbon halides could be caused to react with silicon to yield organo-halogenosilanes. For example, in Rochow Patent 2,380,995, issued August 7, 1945, and assigned to the same assignee as the present invention, hydrocarbon halides are caused to react at elevated temperatures of the order of from about 200° to 500° C. with silicon, preferably in the presence of a metallic catalyst, to yield hydrocarbon-substituted halogenosilanes.

It was also known heretofore that hydrocarbon-substituted halogenosilanes could be prepared by effecting reaction in the vapor phase at highly elevated temperatures of the order of at least 450° C. between a hydrocarbon and a silicon halide, more particularly silicon tetrachloride. By means of this reaction a hydrogen halide is split off to yield the hydrocarbon-substituted halogenosilane, the valence bond formerly bonding the removed hydrogen to the hydrocarbon now bonding the hydrocarbon to the silicon atom by means of a C-Si bond.

I have now discovered that I can by direct synthesis prepare hydrocarbon-substituted halogenosilanes easily and cheaply using much lower temperatures of reaction than has previously been possible by causing an unsaturated compound, preferably one containing a single olefinic linkage, to react with a silicon hydride of the type described above.

In accordance with my invention, I effect the reaction between the reactants at a temperature of from about 0° to 150° C. with at least a part of the reactants in the liquid phase and in the presence of a catalyst or promoter for the reaction whereby scarcely any polymerization of the olefin is effected. By means of these conditions of reaction, I can cause the hydrogen attached directly to the silicon atom to add across the double bond of the above-described unsaturated compound without losing any atom of either the unsaturated compound or silicon hydride through the formation of by-products.

It was entirely unexpected and in no way could have been predicted that the aforementioned reaction would proceed in accordance with the above description since it was found that such compounds, for example, SiCl$_4$, SiBr$_4$, CH$_3$SiBr$_3$, and (CH$_3$)$_2$SiBr$_2$ did not add to unsaturated hydrocarbons under the aforementioned conditions of reaction. This also was contrary to the teachings of Kharasch et al. who showed, for example, that carbon tetrachloride, bromotrichloromethane, carbon tetrabromide, and bromoform would all react with olefins to give hydrocarbon-substituted halogenomethanes [see, for example, Kharasch, Urry and Reinmuth, Abstracts of the 109th Meeting of the American Chemical Society, page 6M; Kharasch, Jensen and Urry, Journal of the American Chemical Society, 68, 154 (1946)].

The general reaction embraced by my claimed invention is carried out in the presence of a peroxy catalyst for the reaction which is preferably soluble in one of the reactants. The catalyst may be described generally as one which is ordinarily employed as a polymerization catalyst for vinyl compounds and which is preferably capable of supplying free radicals, e. g., alkyl radicals, aryl radicals, etc. Among such catalysts may be mentioned, for example, aliphatic acyl peroxides, for instance, diacetyl peroxide, lauryl peroxide, stearyl peroxide, caprylyl peroxide, di-(methyl maleoyl) peroxide, etc.; peroxides of the aromatic series, for instance, dibenzoyl peroxide, 3,4-dichlorobenzoyl peroxide, etc.; mixed aliphatic and aromatic peroxides, for instance, acetyl benzoyl peroxide, etc.; organic hydroperoxides, for instance, secondary-butyl hydroperoxide, tertiary-butyl hydroperoxide, 1-hydroxycyclohexyl hydroperoxide-1, etc.; various organic per-compounds, for instance, di-(tertiary-butyl perphthalate), di-(tertiary-butyl persuccinate), di-(tertiary-butyl peradipate), tertiary-butyl perfuroate, tertiary-butyl perbenzoate, etc.; dihydrocarbon peroxides, for instance, diethyl peroxide, ethylbutyl peroxide, di-(tertiary-butyl) peroxide, dibenzal diperoxide, etc.; other peroxides, such as ascaridole, cyclohexanone peroxide, urea hydrogen peroxide, diheptanol peroxide, etc. Diacetyl and dibenzoyl peroxides are the preferred catalysts.

Any suitable amount of catalyst may be used, but in general the catalyst concentration will be in the range of from about 0.01 to 1 or more mols catalyst per mol of the unsaturated compound, preferably from 0.05 to 0.25 mol catalyst per mol unsaturated compound. The amount of catalyst employed will vary depending, for example, on the amount of inhibitory impurities in the reactants, type of reactants, etc.

Although ultraviolet light causes the formation of the organo-silicon compounds, I prefer to use preformed catalysts of the type disclosed above. The use of Friedel-Crafts catalysts, for example, aluminum chloride, etc., should be avoided since they tend to cause the formation of excessive amounts of undesirable by-products with a subsequent reduction in yield of the desired product.

The reaction between the unsaturated compound and the silicon hydride may be carried out in several ways. One method comprises mixing the reactants, i. e., the unsaturated compound and the silicon hydride, together with the catalyst in a pressure reactor capable of being heated and preferably provided with a means of agitation. The pressure reactor or autoclave is then heated under autogenous pressure at a temperature of from about 0° to 150° C., preferably from about 60° to 120° C. Where the unsaturated compound and silicon hydride have sufficiently high boiling points, I may conduct the reaction at atmospheric pressure in an open reaction chamber. It is desirable to conduct the reaction under such conditions that the reactants and catalysts are in the same phase.

At the conclusion of the reaction, the contents of the autoclave are removed and the components of the reaction mass separated as, for example, by fractional distillation. This method, i. e., fractional distillation, of separating the desired product from the reaction mass is particularly amenable to my type of reaction since the relatively low temperatures employed in the course of the reaction prevent the formation of undesirable by-products which might interfere with the separation of the desired product and recovery of the unreacted materials.

The proportions of the unsaturated compound and the silicon compound employed in my process may be varied within wide limits depending upon the type of product desired. I prefer to employ at least one mol, for example, from about 1.5 to 6 or more mols, of the silicon compound per mol of the unsaturated compound.

In order that those skilled in the art may better understand how the present invention may be practiced the following specific examples are given by way of illustration rather than by way of limitation.

Example 1

A mixture of 203 grams (1.5 mols) trichlorosilane, 54 grams (approximately 1.0 mol) isobutylene and 5 grams (0.026 mol) tertiary-butyl perbenzoate were placed in a glass-lined autoclave and the mass heated for 27.5 hours at 80° C. At the end of this time the autoclave was cooled, the reaction mass removed and fractionally distilled to yield about 19.2 grams of isobutyltrichlorosilane boiling at about 135° C. and having a freezing point of approximately −78° C. Analysis of this compound showed it contained about 55.25 per cent hydrolyzable chlorine (calculated 55.53 per cent).

Example 2

Employing the same apparatus and procedure as in Example 1, approximately 134 grams (1.0 mol) trichlorosilane, 57 grams (0.75 mol) cyclohexene and about 3 grams (0.026 mol) diacetyl peroxide in a small amount of dimethyl phthalate were heated together. From the reaction mass was isolated 49.5 grams cyclohexyltrichlorosilane (boiling point 199°–200° C.) which represented a yield of 64.4 per cent based on the weight of cyclohexene that disappeared. Analysis of this product showed it contained 48.4 per cent hydrolyzable chlorine (calculated 48.89 per cent chlorine).

Example 3

A mixture of 35 grams (0.5 mol) n-pentene-1, 115 grams (1.0 mol) methyldichlorosilane and 5 cc. of a 30 per cent solution of diacetyl peroxide in dimethyl phthalate was heated in a glass-lined autoclave for 4 hours at 70° C. At the end of this time, the reaction mass was fractionally distilled to yield methylpentyldichlorosilane, which is a colorless liquid boiling at 164–168° C. Analysis of the compound showed it contained 38.3 per cent hydrolyzable chlorine (calculated 38.4 per cent chlorine).

Example 4

Employing the same apparatus as in Example 1, a mixture of 115 grams (1.0 mol) methyldichlorosilane, 52.5 grams (0.75 mol.) n-pentene-2 and 10 cc. (0.26 mol) of a 30 per cent solution of diacetyl peroxide in dimethyl phthalate was heated for 12 hours at 100° C. Fractional distillation of the reaction mass yielded about 30 grams of methyl pentyldichlorosilane having a boiling point of about 100° C. at 100 mm. Analysis of this compound showed that it contained 38.0 per cent hydrolyzable chlorine (calculated 38.4 per cent).

Example 5

Approximately 135.5 grams (1.0 mol) trichlorosilane, 35 grams (0.5 mol) n-pentene-1 and 5 cc. (.013 mol) of a 30 per cent solution of diacetyl peroxide were heated together in a glass-lined autoclave for 5 hours at 100° C. Fractional distillation of the reaction mass resulted in a yield of 45 grams of pentyltrichlorosilane boiling between 166° and 169° C. and containing about 51.7 per cent chlorine (calculated 51.9 per cent chlorine).

Example 6

Approximately 80 grams trichlorosilane and 5 cc. (0.013 mol) of a 30 per cent solution of diacetyl peroxide in dimethyl phthalate were placed in a flask. This mixture was frozen with liquid nitrogen and evacuated. Ethylene was then distilled into the flask until about 5 grams had been added. The flask was placed in an autoclave and heated for 8 hours at 100° C. At the end of this time the reaction mass was fractionally distilled to yield a colorless liquid which was identified as ethyltrichlorosilane boiling at 96–97° C. and containing about 66.1 per cent hydrolyzable chlorine (calculated 65.1 per cent chlorine).

Example 7

The compound ethylphenyldichlorosilane may be prepared by effecting reaction in the liquid phase in the presence of an organic peroxide catalyst of the type disclosed previously between ethylene and phenyldichlorosilane ($C_6H_5SiHCl_2$) using the same apparatus and procedure as employed in Example 6.

In addition to the silicon hydrides employed above in the foregoing examples, other silicon hydrides containing a hydrogen and halogen attached directly to the silicon atom of the type described previously may also be employed, for example, inorganic silicon hydrides, for instance, $SiHBr_3$, $SiHCl_2I$, $SiHFBr_2$, $SiHCl_2Br$, $SiH_2Cl_2$, $SiH_2Br_2$, $SiH_2BrCl$, $SiH_3Cl$, $Si_2H_4Cl_2$, $Si_2H_4Br_2$, $Si_2HBr_5$, $Si_2HCl_5$, etc.; silicon halides containing a monovalent hydrocarbon radical, e. g., an alkyl aryl, aralkyl, etc., hydrocarbon connected directly to the silicon by a C-Si linkage, for example, $CH_3SiHBr_2$, $CH_3SiHCII$, $(CH_3)_2SiHCl$ $CH_3SiHBrCl$, $C_3H_7SiHCl_2$, $C_5H_{11}SiHCl_2$ $C_7H_7SiHBr_2$ (benzyldibromosilane), methyl phenylchlorosilane ($CH_3SiHC_6H_5Cl$), etc. The methods for preparing the various silicon hydrides may be ascertained by reference to many of the well-known books and articles on the subject. In the preferred embodiments of this invention, I employ silicon hydrides of the type disclosed above wherein at least two chlorine atoms and at least one hydrogen atom are attached directly to the silicon atom, e. g., $HSiCl_3$, methyldichlorosilane, etc.

Besides the unsaturated aliphatic and cycloaliphatic compounds employed in the foregoing examples, I may use other unsaturated compounds, for example, propylene, n-butylene, n-hexylene and its isomers, n-octene and isomers of n-octene, cetene, etc.; other unsaturated cycloaliphatic hydrocarbons, for example, cyclopentene, cycloheptene, cyclopentadiene, etc. I prefer to use unsaturated compounds containing only a single unsaturation, namely, the double bond

and no other unsaturation.

It will be apparent to those skilled in the art that diluents may be employed in effecting reaction between the unsaturated hydrocarbon and the silicon hydride. However, the reaction is advantageously and preferably effected in the absence of such diluents in order to render the separation of the reaction product less difficult. The reaction should be carried out under anhydrous conditions in order to avoid hydrolysis of the organohalogenosilanes.

The materials obtained by the practice of my invention have many uses among them as intermediates in the preparation of silicone resins similar to those described, for example, in Rochow Patents 2,258,218 and 2,258,220, issued October 7, 1941 and assigned to the same assignee as the present invention. They may also be employed for rendering water-repellent materials which are originally water-non-repellent in accordance with the process disclosed and claimed in Patnode Patent 2,306,222, issued December 2, 1942.

What I claim as new and desire to secure by Letters Patent of the United States, is:

1. The process for preparing a monomeric organohalogenosilane in which all the halogens in the said silane are attached directly to the silicon atom, which process comprises effecting reaction in the liquid phase under substantially anhydrous conditions and under autogenous pressure at a temperature of from 0° to 150° C. in the presence of a vinyl polymerization peroxy catalyst for the reaction between (1) an unsaturated hydrocarbon selected from the class consisting of unsaturated aliphatic hydrocarbons and unsaturated cycloaliphatic hydrocarbons having a single olefine unsaturation, and (2) a silicon hydride containing a hydrogen and a halogen attached directly to the silicon atom, the remaining valences of the silicon being satisfied by a member selected from the class consisting of hydrogen, alkyl radicals, aryl radicals, and halogens.

2. The process for preparing a monomeric organohalogenosilane in which all the halogens in the said silane are attached directly to the silicon atom, which process comprises effecting reaction in the liquid phase under substantially anhydrous conditions and under autogenous pressure at a temperature of from 0° to 150° C. in the presence of a vinyl polymerization peroxy catalyst for the reaction between (1) an unsaturated aliphatic hydrocarbon containing a single

grouping and (2) a silicon hydride containing a hydrogen and a halogen attached directly to the silicon atom, the remaining valences of the silicon atom being satisfied by a member selected from the class consisting of hydrogen, alkyl radicals, aryl radicals, and halogens.

3. The process for preparing a monomeric organohalogenosilane in which all the halogens in the said silane are attached directly to the silicon atom, which process comprises effecting reaction in the liquid phase under substantially anhydrous conditions and under autogenous pressure at a temperature of from 0° to 150° C. in the presence of a vinyl polymerization peroxy catalyst for the reaction between (1) an unsaturated cycloaliphatic hydrocarbon containing a single

grouping and (2) a silicon hydride containing a hydrogen and a halogen attached directly to the silicon atom, the remaining valences of the silicon being satisfied by a member selected from the class consisting of hydrogen, alkyl radicals, aryl radicals, and halogens.

4. The process for preparing a monomeric organochlorosilane wherein all the chlorine atoms in the said silane are attached directly to the silicon atom, which process comprises effecting reaction in the liquid phase under substantially anhydrous conditions and under autogenous pressure at a temperature of from 0° to 150° C. in the presence of an organic peroxide catalyst between (1) a compound selected from the class consisting of unsaturated aliphatic and unsaturated cycloaliphatic hydrocarbons having a single olefinic unsaturation and (2) $SiHCl_3$.

5. The process for preparing a monomeric organochlorosilane wherein all the chlorine atoms in the said silane are attached directly to the silicon atom, which process comprises effecting reaction in the liquid phase under substantially anhydrous conditions and under autogenous pressure at a temperature of from 0° to 150° C. in the presence of an organic peroxide catalyst between (1) a compound selected from the class consisting of unsaturated aliphatic and unsaturated cycloaliphatic hydrocarbons having a single olefinic unsaturation and (2) $CH_3SiHCl_2$.

6. The process for preparing a monomeric organohalogenosilane in which all the halogens in the said silane are attached directly to the silicon atom, which process comprises effecting reaction in the liquid phase under substantially anhydrous conditions and under autogenous pressure at a temperature from 0° to 150° C. in the presence of an organic peroxy catalyst between (1) ethylene and (2) a silicon hydride containing a hydrogen and a halogen attached directly to the silicon atom, the remaining valences of the silicon being satisfied by a member selected from the class consisting of hydrogen, alkyl radicals, aryl radicals, and halogens.

7. The process for preparing a monomeric organhalogenosilane in which all the halogens in the said silane are attached directly to the silicon atom, which process comprises effecting reaction in the liquid phase under substantially anhydrous conditions and under autogenous pressure at a temperature from 0° to 150° C. in the presence of an organic peroxy catalyst between (1) cyclohexene and (2) a silicon hydride containing a hydrogen and a halogen attached directly to the silicon atom, the remaining valences of the silicon being satisfied by a member selected from the class consisting of hydrogen, alkyl radicals, aryl radicals, and halogens.

8. The process for preparing a monomeric organohalogenosilane in which all the halogens in the said silane are attached directly to the silicon atom, which process comprises effecting reaction in the liquid phase under substantially anhydrous conditions and under autogenous pressure at a temperature from 0° to 150° C. in the presence of an organic peroxide catalyst between (1) a pentene and (2) a silicon halide containing a hydrogen and a halogen attached directly to the silicon atom, the remaining valences of the silicon being satisfied by a member selected from the class consisting of hydrogen, alkyl radicals, aryl radicals, and halogens.

9. The process for preparing methylpentyldichlorosilane which comprises effecting reaction in the presence of an organic peroxide catalyst in the liquid phase under substantially anhydrous conditions and under autogenous pressure at a temperature of from 0° to 150° C. between (1) n-pentene-2 and (2) $CH_3SiHCl_2$.

10. The process for preparing ethyltrichlorosilane which comprises effecting reaction in the liquid phase under substantially anhydrous conditions and under autogenous pressure at a temperature of from 60° to 120° C. in the presence of an organic peroxide catalyst between (1) ethylene and (2) $SiHCl_3$.

11. The process for preparing methylpentyldichlorosilane which comprises effecting reaction in the liquid phase under substantially anhydrous conditions and under autogenous pressure at a temperature of from 60° to 120° C. in the presence of an organic peroxide catalyst between (1) n-pentene-2 and (2) $CH_3SiHCl_2$.

12. The process for preparing cyclohexyltrichlorosilane which comprises effecting reaction in the liquid phase under substantially anhydrous conditions and under autogenous pressure at a temperature of from 60° to 120° C. in the presence of an organic peroxide catalyst between (1) cyclohexene and (2) $SiHCl_3$.

ROBERT H. KRIEBLE.

REFERENCES CITED

The following references are of record in the file of this patent:

UNITED STATES PATENTS

| Number | Name | Date |
|---|---|---|
| 2,379,821 | Miller | July 3, 1945 |
| 2,407,181 | Scott | Sept. 3, 1946 |

OTHER REFERENCES

Ellis, "Chemistry of Synthetic Resins" (vol. 1) (1935), page 241, Reinhold, N. Y., publishers.

Sommer, "Jour. Am. Chem. Soc.," vol. 69 (Jan., 1947), page 188.